US011517003B2

(12) United States Patent
Kaihara

(10) Patent No.: US 11,517,003 B2
(45) Date of Patent: Dec. 6, 2022

(54) REMOVABLE EXTENSION FOR A SPINCAST REEL LINE RELEASE BUTTON

(71) Applicant: Pure Fishing, Inc., Spirit Lake, IA (US)

(72) Inventor: Cameron Kaihara, Prosperity, SC (US)

(73) Assignee: Pure Fishing, Inc., Spirit Lake, IA (US)

( * ) Notice: Subject to any disclaimer, the term of this patent is extended or adjusted under 35 U.S.C. 154(b) by 238 days.

(21) Appl. No.: 16/945,117

(22) Filed: Jul. 31, 2020

(65) Prior Publication Data

US 2021/0029982 A1 Feb. 4, 2021

Related U.S. Application Data

(60) Provisional application No. 62/882,020, filed on Aug. 2, 2019.

(51) Int. Cl.
*A01K 89/01* (2006.01)

(52) U.S. Cl.
CPC ................................ *A01K 89/0102* (2013.01)

(58) Field of Classification Search
CPC .................................................. A01K 89/0102
See application file for complete search history.

(56) References Cited

U.S. PATENT DOCUMENTS

| | | | | |
|---|---|---|---|---|
| 3,703,262 A | * | 11/1972 | Menne | A01K 89/0102 242/239 |
| 4,768,731 A | | 9/1988 | Neufeld | |
| 6,131,485 A | * | 10/2000 | Raja | G05G 1/487 74/564 |
| 2005/0173465 A1 | * | 8/2005 | Roden | B65D 83/303 222/402.1 |
| 2015/0232071 A1 | * | 8/2015 | Pelletier | B60W 10/18 477/194 |
| 2017/0059967 A1 | * | 3/2017 | Harrison | F16M 13/00 |

FOREIGN PATENT DOCUMENTS

| | | | |
|---|---|---|---|
| CA | 3022746 A1 | | 11/2017 |
| CN | 207084306 U | | 3/2018 |
| JP | 06033215 U | | 4/1994 |
| JP | 08111141 A | | 4/1996 |
| KR | 19990012892 U | * | 4/1995 |
| KR | 200439892 Y1 | | 5/2008 |

* cited by examiner

*Primary Examiner* — Emmanuel M Marcelo
(74) *Attorney, Agent, or Firm* — Husch Blackwell LLP

(57) ABSTRACT

A removable extension for a line release button of a spincast fishing reel includes an attachment end having one or more attachment structures on one side thereof, the attachment structures configured for removable attachment of the attachment end to the line release button; an engagement end configured for application of a force from a user's thumb; and a transition section connecting the attachment end with the engagement end.

13 Claims, 11 Drawing Sheets

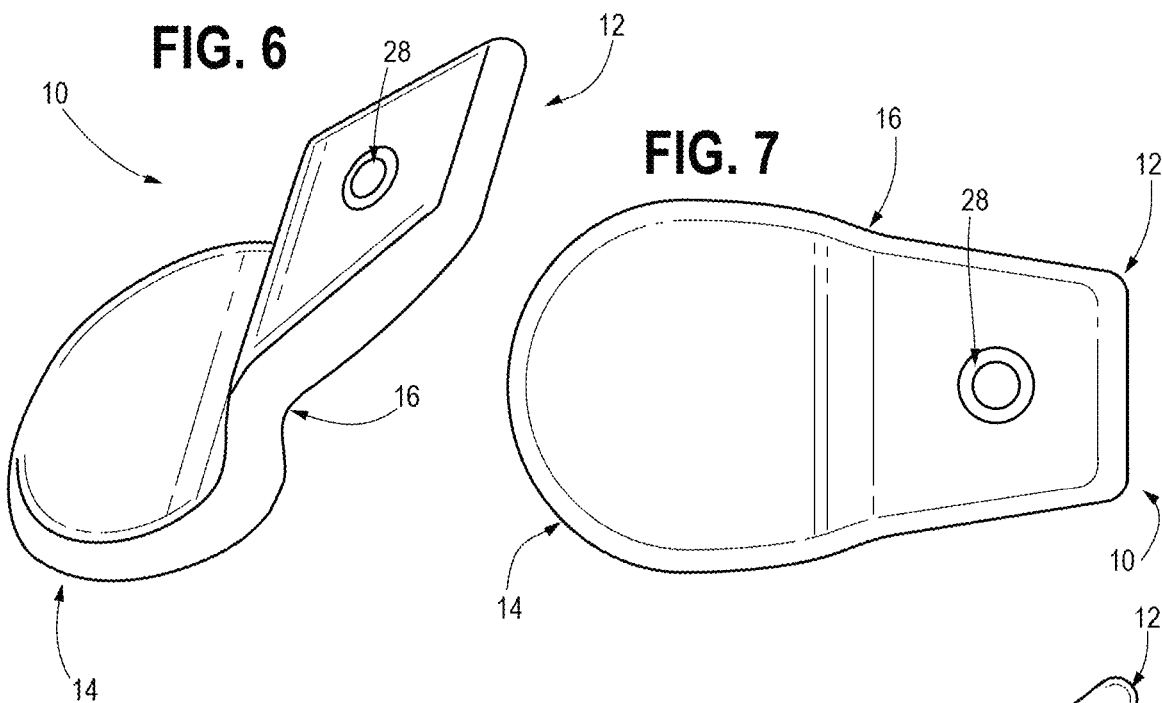
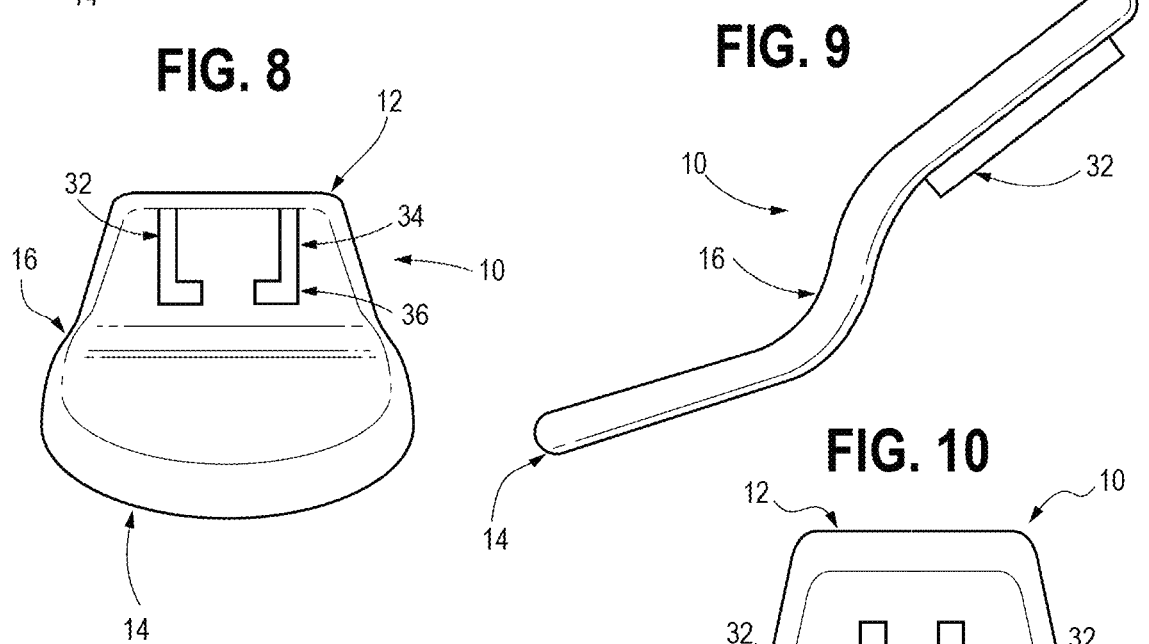
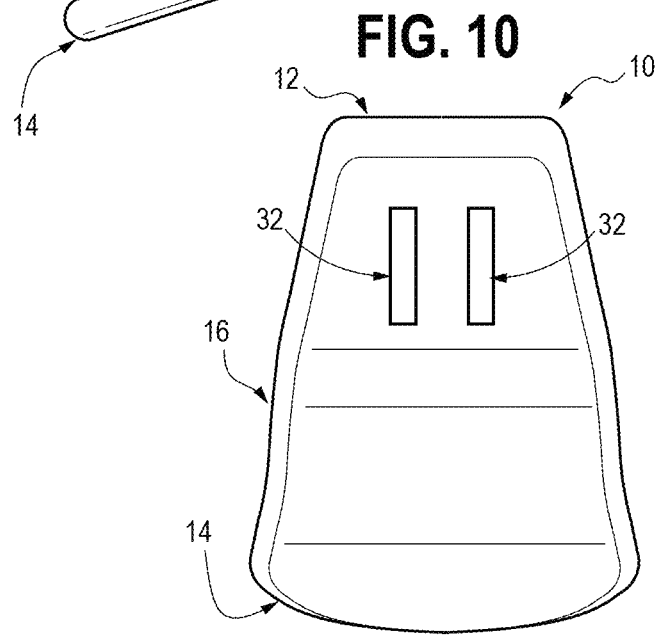

REMOVABLE EXTENSION FOR A SPINCAST REEL LINE RELEASE BUTTON

FIELD OF THE DISCLOSURE

The present disclosure relates to spincast reels and, more particularly, to enhancements for the line release buttons of spincast reels.

BACKGROUND

Spincast reels, as shown, for example in FIG. 1, are frequently the reel of choice for children and other fishing novices due in part to their ease of use. The components of these reels are largely enclosed within a housing. Extending from the back of the housing is a line release button (Ref. B in FIG. 1) that allows line to unreel during casting. In order to effectively use these reels, the user must be able to fully engage the line release button consistently. While youth-sized spincast reels are produced to accommodate smaller hands and fingers, these products are not able to "grow" with the user. Instead, a new reel must be purchased as the child grows.

Further, for users with limited dexterity and/or hand and finger strength, it is difficult to successfully manipulate the line release button of any size reel.

Therefore, a need exists for a way to make the line release button on a spincast reel adjustable to accommodate small hand sizes and those with less manual dexterity and/or strength.

SUMMARY

An aspect of the present disclosure is to provide a removable ergonomic enhancement for a spincast fishing reel.

Another aspect of the present disclosure is to provide a removable extension for a line release button of a spincast fishing reel that includes an attachment end having one or more attachment structures on one side thereof, the attachment structures configured for removable attachment of the attachment end to the line release button; an engagement end configured for application of a force from a user's thumb; and a transition section connecting the attachment end with the engagement end.

These aspects are merely illustrative of the innumerable aspects associated with the present disclosure and should not be deemed as limiting in any manner. These and other aspects, features and advantages of the present disclosure will become apparent from the following detailed description when taken in conjunction with the referenced drawings.

DESCRIPTION OF DRAWINGS

Reference is now made more particularly to the drawings, which illustrate one or more embodiments of the present disclosure and wherein similar reference characters indicate the same parts throughout the views.

FIG. 6 is a perspective view of a removable extension for a line release button of a spincast reel according to another embodiment of the present disclosure.

FIG. 7 is a top view of the removable extension of FIG. 6.

FIG. 8 is an end view of a removable extension for a line release button of a spincast reel according to another embodiment of the present disclosure.

FIG. 9 is a side view of the removable extension of FIG. 8.

FIG. 10 is an end view of the removable extension of FIG. 8 that also shows a portion of the underside of the attachment end of the removable extension.

DETAILED DESCRIPTION

Figure 1:
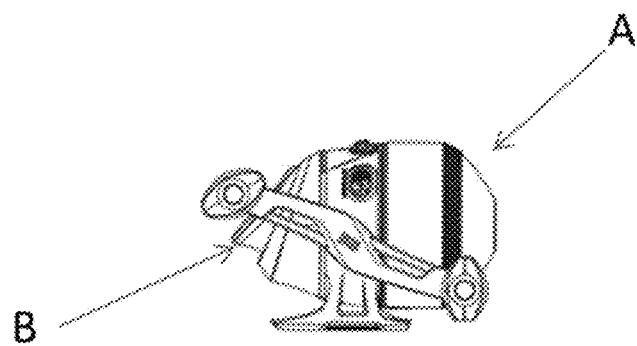
FIG. 1 is an illustration of a common spincast reel showing exemplary components of the reel.
Figure 2:
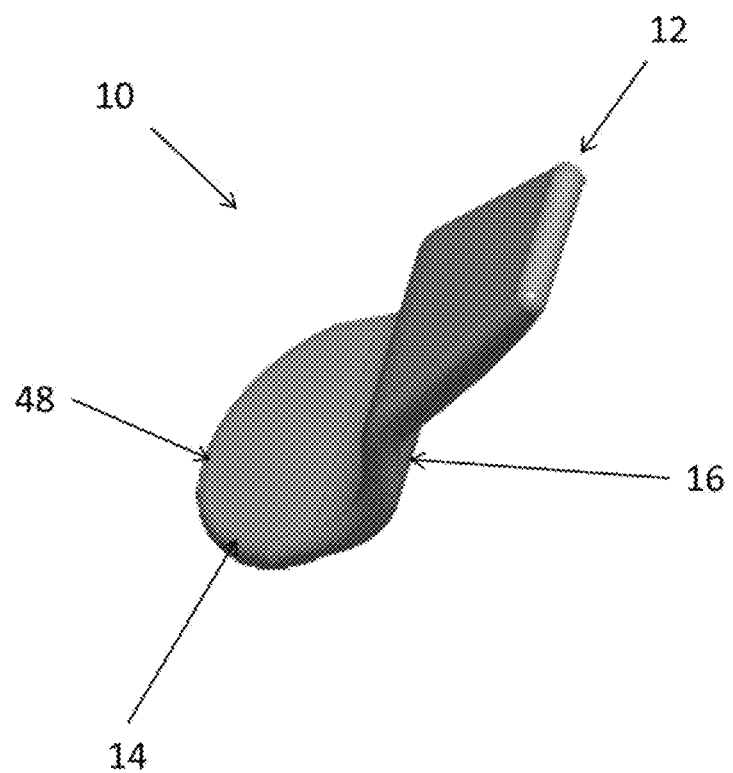
FIG. 2 is a perspective view of a removable extension for a line release button of a spincast reel according to one embodiment of the present disclosure.
Figure 3:
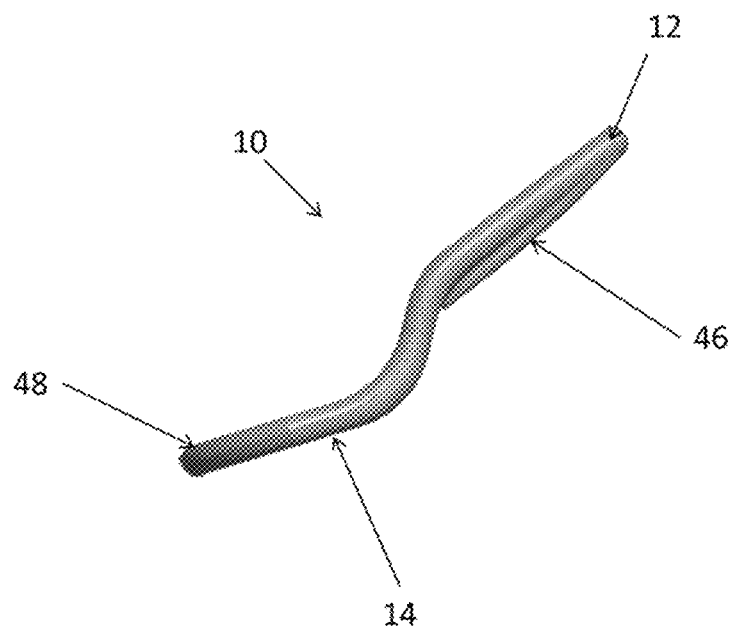
FIG. 3 is a side view of the removable extension of FIG. 2.
Figure 4:
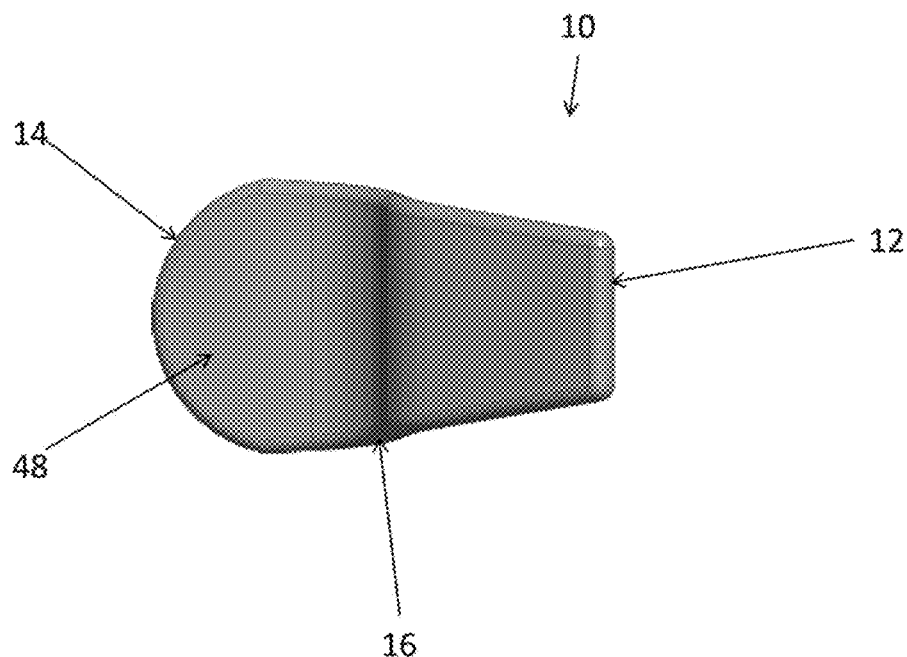
FIG. 4 is a top view of the removable extension of FIG. 2.
Figure 5:
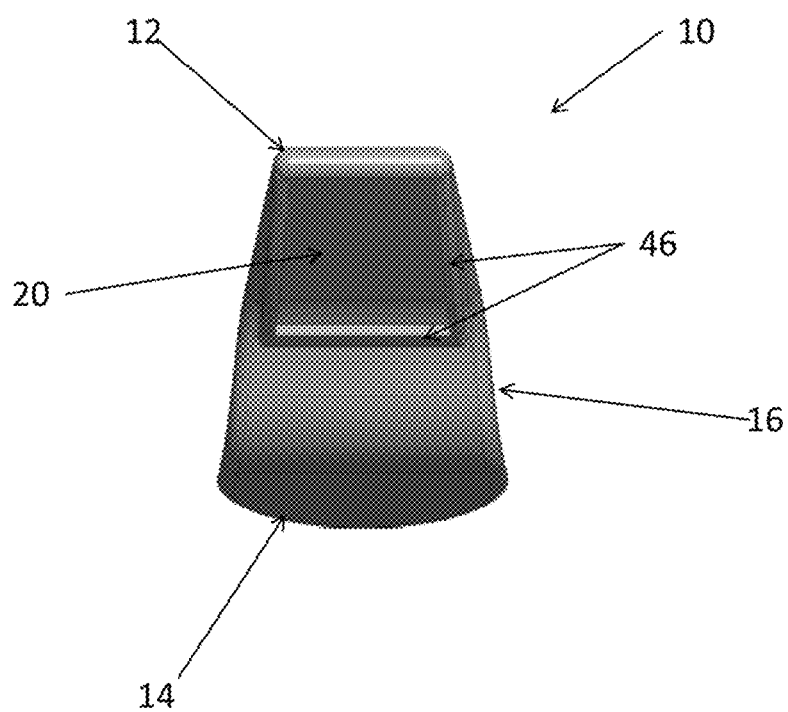
FIG. 5 is an end view of the removable extension of FIG. 2 that also shows a portion of the underside of the attachment end of the removable extension.
Figure 11:
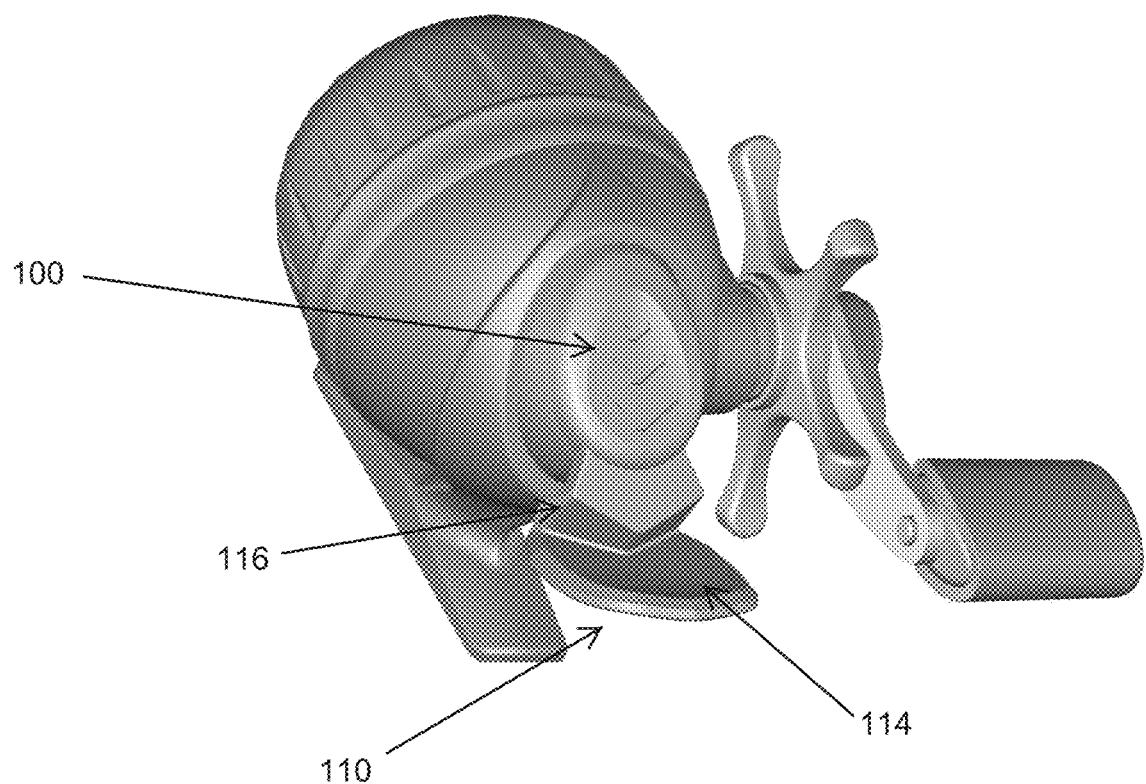
FIG. 11 is a perspective view of a spincast reel incorporating a removable extension according to another embodiment of the present disclosure.
Figure 12:
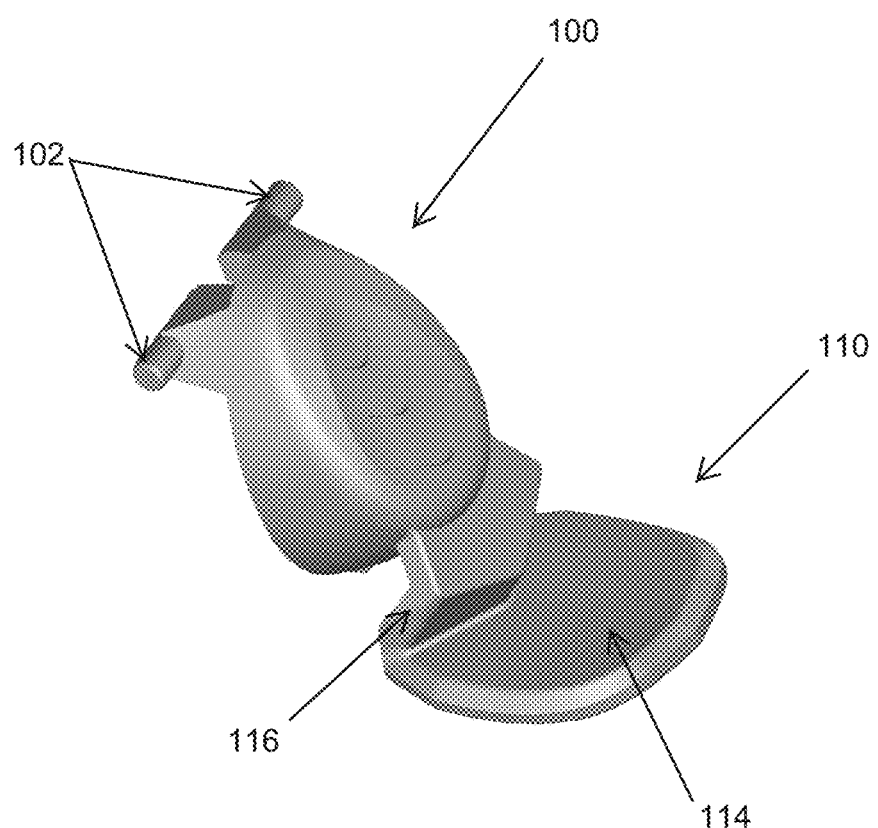
FIG. 12 is a perspective view of the line release button and removable extension of FIG. 11.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. The following definitions and non-limiting guidelines must be considered in reviewing the description of the technology set forth herein.

The headings (such as "Introduction" and "Summary") and sub-headings used herein are intended only for general organization of topics within the present disclosure, and are not intended to limit the disclosure of the technology or any aspect thereof. In particular, subject matter disclosed in the "Introduction" may include novel technology and may not constitute a recitation of prior art. Subject matter disclosed in the "Summary" is not an exhaustive or complete disclosure of the entire scope of the technology or any embodiments thereof. Classification or discussion of a material within a section of this specification as having a particular utility is made for convenience, and no inference should be drawn that the material must necessarily or solely function in accordance with its classification herein when it is used in any given composition.

The citation of references herein does not constitute an admission that those references are prior art or have any relevance to the patentability of the technology disclosed herein. All references cited in the "Description" section of this specification are hereby incorporated by reference in their entirety.

The description and specific examples, while indicating embodiments of the technology, are intended for purposes of illustration only and are not intended to limit the scope of the technology. Moreover, recitation of multiple embodiments having stated features is not intended to exclude other embodiments having additional features, or other embodiments incorporating different combinations of the stated features. Specific examples are provided for illustrative purposes of how to make and use the apparatus and systems of this technology and, unless explicitly stated otherwise, are not intended to be a representation that given embodiments of this technology have, or have not, been made or tested.

As used herein, the word "include," and its variants, is intended to be non-limiting, such that recitation of items in a list is not to the exclusion of other like items that may also be useful in the materials, compositions, devices, and methods of this technology. Similarly, the terms "can" and "may" and their variants are intended to be non-limiting, such that recitation that an embodiment can or may comprise certain elements or features does not exclude other embodiments of the present technology that do not contain those elements or features.

"A" and "an" as used herein indicate "at least one" of the item is present; a plurality of such items may be present, when possible. "About" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. In addition, disclosure of ranges includes disclosure of all distinct values and further divided ranges within the entire range.

A removable extension 10 for a spincast reel A is illustrated in FIGS. 2-10. The removable extension 10 attaches to the line release button B of the spincast reel A in order to temporarily enhance the ergonomics of the line release button for users having smaller hands or those with compromised manual dexterity and/or.

The removable extension 10 includes an attachment end 12 and an engagement end 14. The attachment end 12 may be advantageously configured to, at least in part, follow the contours of the line release button B in order to provide increased support and stability for the removable extension 10. More particularly, the attachment end 12, which is generally flat in profile, transitions to a transition section 16 that connects the attachment end 12 with the engagement end 14. In the illustrated embodiment, the transition section 16 is angled and connects with the attachment end 12 at an obtuse angle. The angled 16 connection between the attachment end 12 and the angled section 16 is intended to contact with the line release button B at its corner portion. In alternate embodiments, the attachment end 12 and engagement end 14 of the extension may lie in the same plane, wherein the transition section 16 is generally straight rather than angled.

One side of the attachment end 12 of the removable extension 10 is provided with an attachment structure that may take various forms. For example, as shown in FIGS. 2-5, an adhesive pad 20 may be permanently affixed to the one side of the attachment end 12. The adhesive pad 20 may be provided with a releasable adhesive on the side that contacts the line release button B. Prior to installation on the spincast reel, the adhesive pad 20 may be covered with a backing sheet (not shown) in order to protect the adhesive and prevent unintended application of the extension 10. One advantage of this arrangement is that no modifications need be made to the line release button B in order to use the extension 10 with the reel A.

In this embodiment, the removable extension 10 is applied by removing the backing sheet, aligning the attachment end 12 with the line release button, and pressing the attachment end 12 onto the line release button B. When the extension 10 is no longer needed, it may simply be pulled off of the line release button B and any residual adhesive removed.

In another embodiment illustrated in FIGS. 6 and 7, a screw 26 or other mechanical fastener may be used to connect the attachment end 12 with the top surface of the line release button. More particularly, the attachment end 12 may be provided with a through hole 28 to accommodate the screw 26. With this embodiment, a threaded hole (not shown) in the top surface of the line release button may be provided to securingly accept the screw 26. Preferably, the through hole 28 in the attachment end 12 of the extension 10 is provided with a countersink recess so that the attachment end 12 maintains a generally flush top surface after the screw 26 is inserted.

To connect the extension 10 with the line release button, the attachment end 12 is again aligned with the top surface of the line release button. More particularly, the through hole 28 of the attachment end 12 is aligned with the threaded hole of the line release button. The screw 26 is then inserted into the through hole 28 of the attachment end 12 and threaded into the hole in the line release button. In order to remove the extension 10, the screw 26 is removed.

FIGS. 8-10 illustrate a third embodiment, in which the underside of the attachment end 12 of the extension is provided with a pair of parallel rails 32. The rails 32 extend along the long axis of the attachment end 12. Each rail 32 is provided with a vertical portion 34 and a horizontal portion 36. The vertical portion 34 extends downward from the underside of the attachment end 12. The horizontal portion 36 extends either medially or laterally from the vertical portion 34 at approximately a right angle to the vertical portion 34.

Structures corresponding to the rails 32 are provided on the top surface of the line release button B. More particularly, the matching rails similarly each include an upwardly extending vertical portion and a horizontal portion. The horizontal portions of the matching rails extend either medially or laterally from the vertical portions at approximately a right angle to the vertical portions. More particularly, the horizontal portions of the line release button extend in the opposite direction of the horizontal portions 36 of the attachment end of the extension 10. The matching rails may further be provided with a base portion that supports and connects the matching rails to facilitate attachment to the top surface of the line release button B by means of adhesive, screw, pin, rivet, or other mechanical securing structures and methods.

Further, the spacing between the matching rails is configured to be slightly less or more than the rails 32 of the attachment end 12 such that the rails 32 and matching rails may be slid into position with one of the rails 32 or matching rails inside the other. In addition, one of the vertical portions of the rails 34 or the matching rails may have a greater "height" relative to their supporting surface than the other in order for the horizontal portions of the respective rails to be able to nest one within the other. In an embodiment in which the matching rails are configured to fit within the rails 32 of the attachment end, the horizontal portions of the matching rails may extend laterally toward the rails 32 while the horizontal portions of the rails 32 may extend medially toward the matching rails. In an alternate embodiment, in which the rails 32 are configured to fit within the matching rails, the horizontal portions 36 of the rails 32 may extend laterally while the horizontal portions of the matching rails may extend medially.

In each case, the arrangement of the rails and matching rails and their respective horizontal portions may result in the vertical and horizontal portions of either the rails or matching rails capturing the corresponding components of the other. In order to mate the extension 10 with the line release button B in the foregoing embodiment, the attachment end 12 is again aligned with the top surface of the line release button B but, in this embodiment, is moved in a sliding motion along the top surface of the line release button B such that the vertical and horizontal portions of the rails or matching rails engage the corresponding components of the other.

FIGS. 11-17 illustrate another embodiment of the present disclosure. Line release button 100 is pivotably connected with the reel by hinge pins 102 at the upper end of the line release button 100. A restricting tab 108 at the lower end of the line release button 100 retains the line release button within the housing of the reel. Also, adjacent the lower end of the line release button 100 are one or more extension slots 104 that allow access into the interior of the line release button 100. A spine 106 extends vertically at the approximate center of the rear side of the line release button 100. In some embodiments, the spine 106 may extend to the lower end of the line release button 100 and essentially bisect the extension slot 104.

The removable extension 110 incorporates components similar to the embodiments as described above, including an attachment end 112, a transition section 116, and an engagement end 114. In this embodiment, the attachment end 112 may be configured to coordinate with the particular structures of the line release button 100. More particularly, the attachment end 112 may be provided with two, parallel legs 118 that may give a roughly U-shaped structure to the attachment end 112. The legs 118 of the attachment end 112 are configured to insert within the extension slot 104 of the line release button 100. The inner sides of the upper ends of the legs 118 may be provided with locking tabs 120 that may be used as described below.

Figure 13:
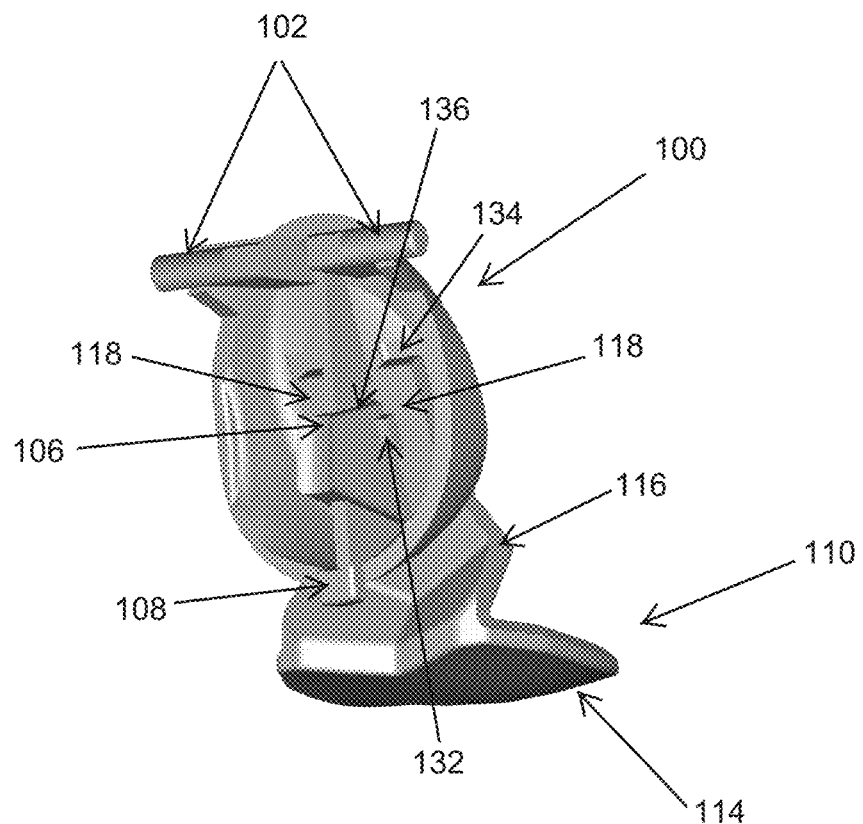
FIG. 13 is a rear perspective view of the line release button and removable extension of FIG. 11.
Figure 14:
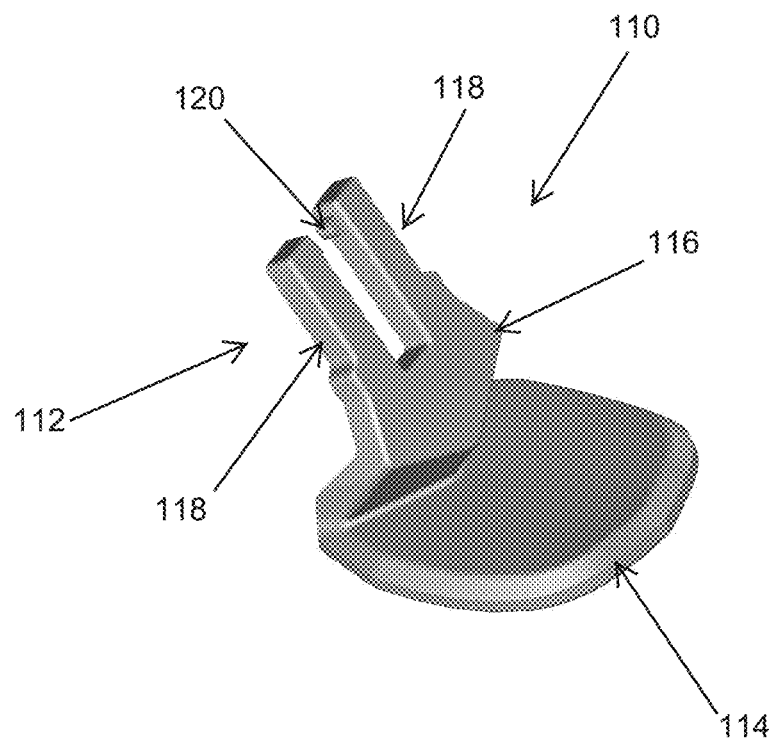
FIG. 14 is a perspective view of the removable extension of FIG. 11.
Figure 15:
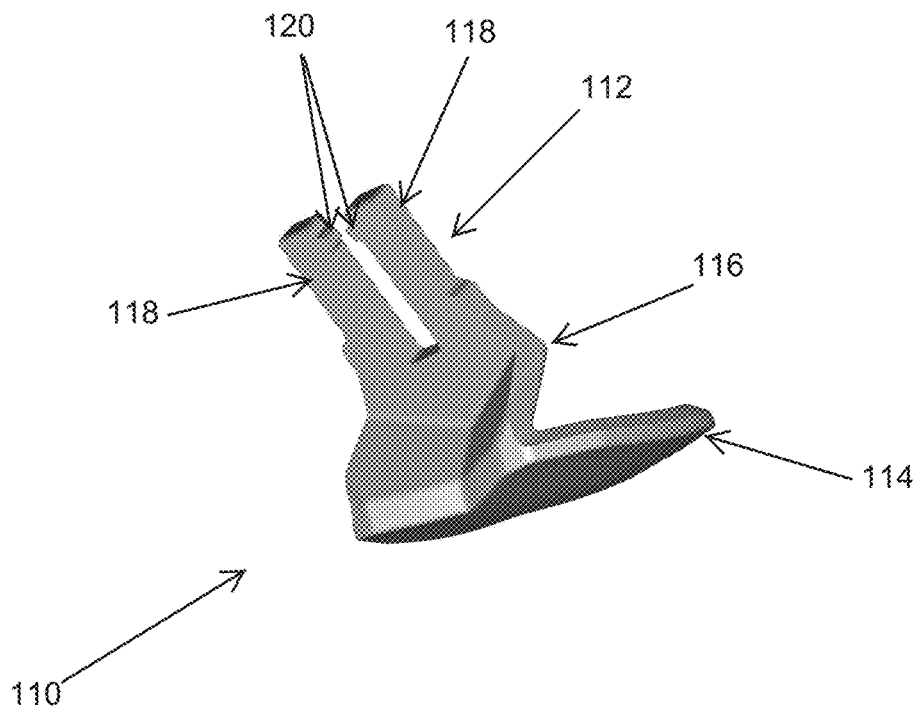
FIG. 15 is a rear perspective view of the removable extension of FIG. 11.
Figure 16:
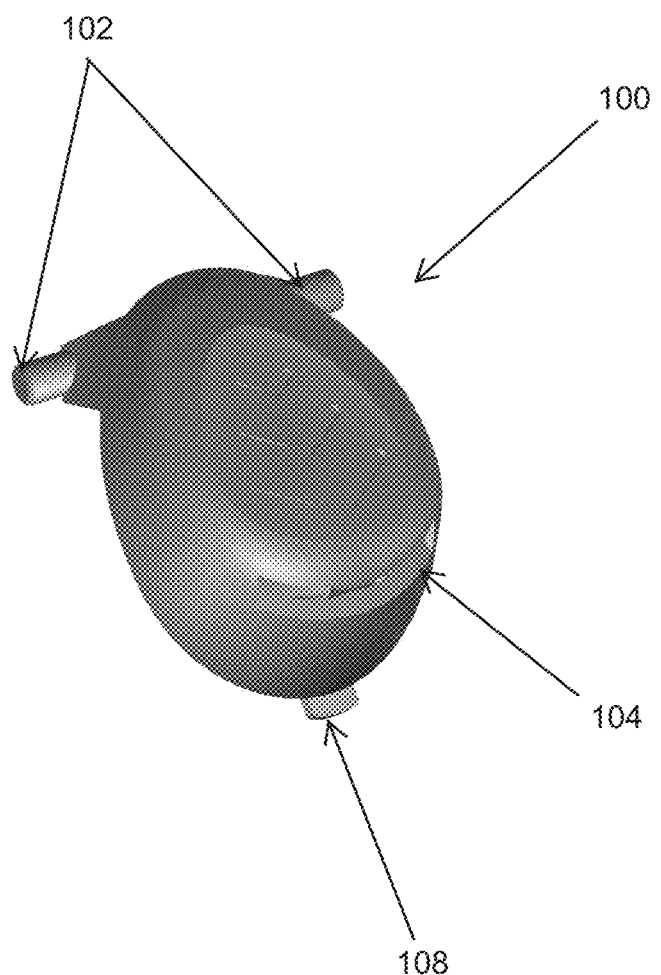
FIG. 16 is a perspective view of the line release button of FIG. 11.
Figure 17:
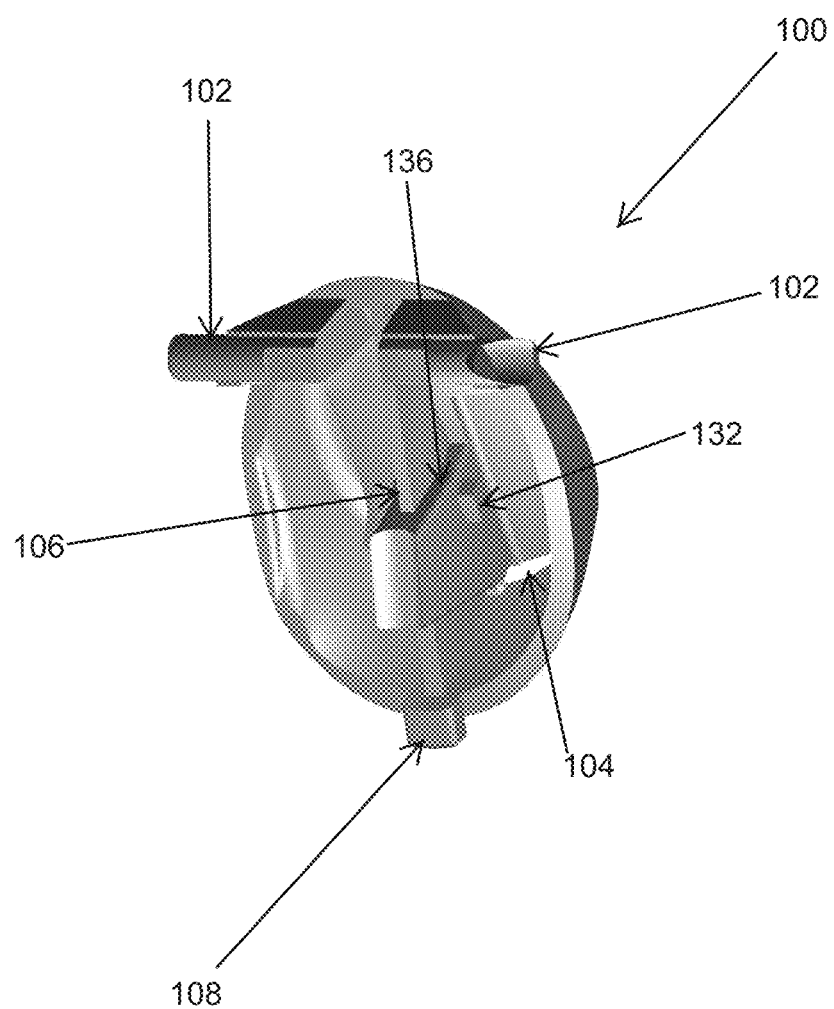
FIG. 17 is a rear perspective view of the line release button of FIG. 11.

In an embodiment in which the extension slot 104 is divided in two by the spine 106, the two legs 118 and open area of the attachment end 112 are configured to be inserted into the extension slot 104 while straddling the spine 106, as may be more clearly seen in FIG. 13. The spine 106 of the line release button 100 may be further provided with a thickened midsection 130 having a greater width than the rest of the spine 106. As can be seen in FIGS. 13 and 16, the transition at the top of the thickened midsection 130 to the upper portion of the spine 106 creates a retaining surface(s) that may be used to engage the locking tab(s) 120 to restrict movement of the leg(s) 118 from the extension slot 104 after the legs 118 have been inserted into the line release button 100 without the application of a significant downward force on the removable extension 110. As the legs 118 of the attachment end 112 are inserted through the extension slot 104, straddling the spine 106, the legs 118 are forced slightly apart as a result of the locking tabs 120, having a distance between them that is less than the width of the thickened section 130. As the locking tabs 120 reach the upper, narrower portion of the spine 106, the legs 118 rebound to their natural position. This places the locking tabs 120 into engagement with the retaining surface of the thickened section 130, removably securing the legs 118 within the extension slot 104.

The rear of the line release button 100 may further be provided with one or more guide tabs 132 and stop tabs 134. The guide tabs 132 extend from the spine, in one embodiment from the thickened section 130 of the spine 106 and guide the legs 118 into proper alignment within the extension slot 104 to ensure appropriate positioning of the removable extension 110 with the line release button 100. The stop tabs 134 may serve to limit further vertical movement of the legs 118 and help maintain engagement of the locking tabs 120 with the retaining surface of the thickened section 130 once the locking tabs 120 have reached their engaged position.

To remove the removable extension 110 from the line release button 100, a downward force is applied to the transition section 116 and/or engagement end 114 of the extension 110 to pull the locking tabs 120 from the retaining surface such that the legs 118 are again slightly spread apart to slide around the thickened section 130 and extract the legs 118 from the extension slot 104.

Note that a similar result may be obtained, and is contemplated within the scope of the present disclosure, by utilizing a single leg 118 with one or more locking tabs 120, for example on the outside surfaces of the leg 118, that is inserted into a single extension slot 104 to engage retaining surfaces on one or both slides of the leg 118 as it is inserted.

While exemplary embodiments of means to removably attach the extension 10 to the line release button B are described above, other temporary securement structures are contemplated within the scope of the present disclosure.

The extension 10 is preferably constructed at least in part from a relatively rigid material to minimize flexion of the extension 10 during use in order to maintain operate engagement with and exertion of necessary force on the line release button B for effective operation of the line release button B. The attachment end 12 may be provided with one or more ribs (46) in any number of configurations in order to further maintain rigidity.

In some embodiments, the engagement end 14 of the extension may be provided with an exterior surface or grip 18, in the form of an applied coating, slip-on piece, or other form of a more resilient material to enhance comfort and help reduce fatigue for the user. The grip 18 is preferably provided over a core of more rigid material. While the attachment end 12 of the extension 10 may be shaped and sized to match the top surface of the line release button B, the engagement end 14 may be provided with a greater width to further facilitate engagement of the user's thumb with the engagement end 14 of the extension 10. The sides of the extension 10 may be provided with a gradual transition from the attachment end 12 to the engagement end 14.

The preferred embodiments of the present disclosure have been described above to explain the principles of the invention and its practical application to thereby enable others skilled in the art to utilize the invention. However, as various modifications could be made in the constructions and methods herein described and illustrated without departing from the scope of the invention, it is intended that all matter contained in the foregoing description or shown in the accompanying drawings, including all materials expressly incorporated by reference herein, shall be interpreted as illustrative rather than limiting. Thus, the breadth and scope of the present invention should not be limited by the above-described exemplary embodiment, but should be defined only in accordance with the following claims appended hereto and their equivalents.

What is claimed is:

1. A removable extension for a line release button of a spincast fishing reel, comprising:
    an attachment end having one or more attachment structures on one side thereof, the attachment structures configured for removable attachment of the attachment end to the line release button;
    an engagement end configured for application of a force from a user's thumb;
    a transition section connecting the attachment end with the engagement end;
    wherein the one or more attachment structures further comprise at least one of at least one adhesive pad or one or more attachment rails and wherein the line release button further comprises one or more corresponding rails that are configured to slideably engage the one or more attachment rails.

2. A spincast fishing reel, comprising:
    a line release button;
    an attachment end having one or more attachment structures on one side thereof, the attachment structures configured for removable attachment of the attachment end to the line release button;
    an engagement end configured for application of a force from a user's thumb; and
    a transition section connecting the attachment end with the engagement end.

3. The spincast fishing reel as set forth in claim 2, wherein the one or more attachment structures further comprise at least one adhesive pad.

4. The spincast fishing reel as set forth in claim 2, wherein the one or more attachment structures further comprise at least a first opening in the attachment end configured to accept a mechanical fastener and wherein the line release button further includes a corresponding second opening configured to accept the mechanical fastener.

5. The spincast fishing reel as set forth in claim 4, wherein the mechanical fastener is a screw.

6. The spincast fishing reel as set forth in claim 2, wherein the one or more attachment structures further comprise one or more attachment rails and wherein the line release button further comprises one or more corresponding rails that are configured to slideably engage the one or more attachment rails.

7. A method of adapting a line release button of a spincast fishing reel for users with less dexterity, comprising the steps of:
    providing a removable extension, comprising:
        an attachment end having one or more attachment structures on one side thereof, the attachment structures configured for removable attachment of the attachment end to the line release button;
        an engagement end configured for application of a force from a user's thumb; and
        a transition section connecting the attachment end with the engagement end; and
    connecting the one or more attachment structures with the line release button.

8. The method of adapting a line release button of a spincast fishing reel as set forth in claim 7, further comprising the step of removing the removable extension by disconnecting the one or more attachment structures from the line release button.

9. The method of adapting a line release button of a spincast fishing reel as set forth in claim 7, wherein the one or more attachment structures further comprise at least one adhesive pad.

10. The method of adapting a line release button of a spincast fishing reel as set forth in claim 7, wherein the one or more attachment structures further comprise at least a first opening in the attachment end configured to accept a mechanical fastener and wherein the line release button further includes a corresponding second opening configured to accept the mechanical fastener.

11. The method of adapting a line release button of a spincast fishing reel as set forth in claim 10, wherein the mechanical fastener is a screw.

12. The method of adapting a line release button of a spincast fishing reel as set forth in claim 7, wherein the one or more attachment structures further comprise one or more attachment rails and wherein the line release button further comprises one or more corresponding rails that are configured to slideably engage the one or more attachment rails.

13. A removable extension for a line release button of a spincast fishing reel, comprising:
    an attachment end having one or more attachment structures on one side thereof, the attachment structures configured for removable attachment of the attachment end to the line release button;
    the attachment structures comprising at least one upwardly extending leg, the leg including at least one locking tab;
    an engagement end configured for application of a force from a user's thumb;
    a transition section connecting the attachment end with the engagement end; and
    wherein the line release button further comprises at least one extension slot configured to allow insertion of the at least one leg and a retaining surface configured to engage with the locking tab to restrict removal of the at least one leg from the extension slot.

* * * * *